D. C. OWEN.
Coupling-Joint for Cultivator-Teeth.

No. 223,752. Patented Jan. 20, 1880.

Attest:
P. Walter Fowler,
Jno. L. Coudron.

Inventor:
Daniel C. Owen
Per att'ys A. H. Evans & Co.

UNITED STATES PATENT OFFICE.

DANIEL C. OWEN, OF LA PRAIRIE, ILLINOIS.

COUPLING-JOINT FOR CULTIVATOR-TEETH.

SPECIFICATION forming part of Letters Patent No. 223,752, dated January 20, 1880.

Application filed October 17, 1879.

*To all whom it may concern:*

Be it known that I, DANIEL C. OWEN, of La Prairie, Adams county, Illinois, have invented a new and Improved Coupling-Joint for Cultivator-Teeth, of which the following is a clear, full, and exact description, reference being had to the accompanying drawings, in which—

Figure 1:
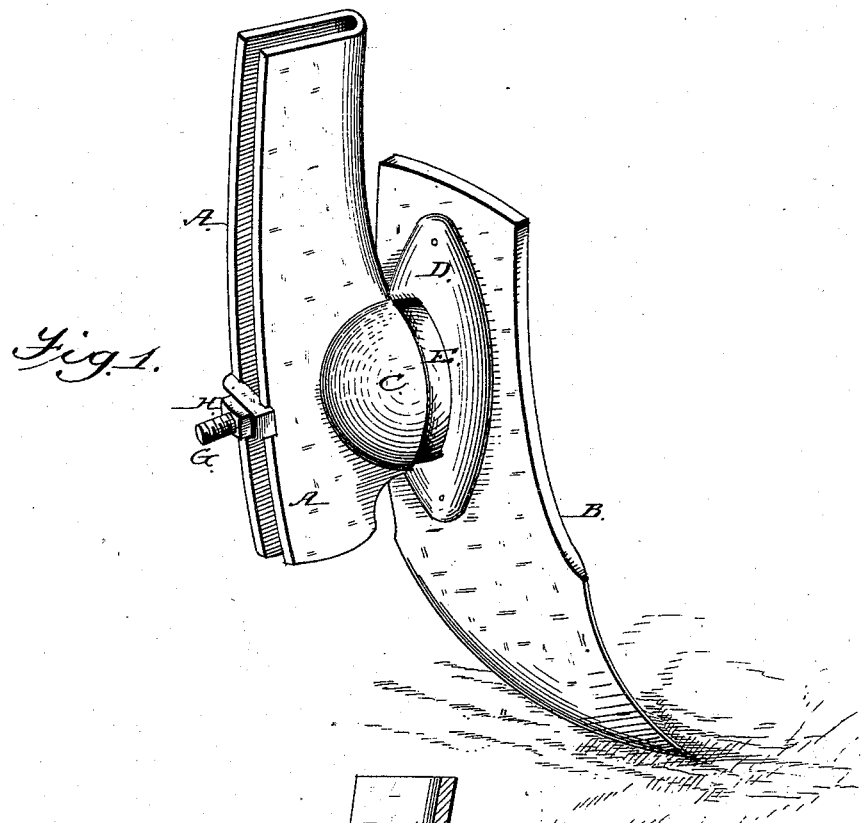
Figure 2:
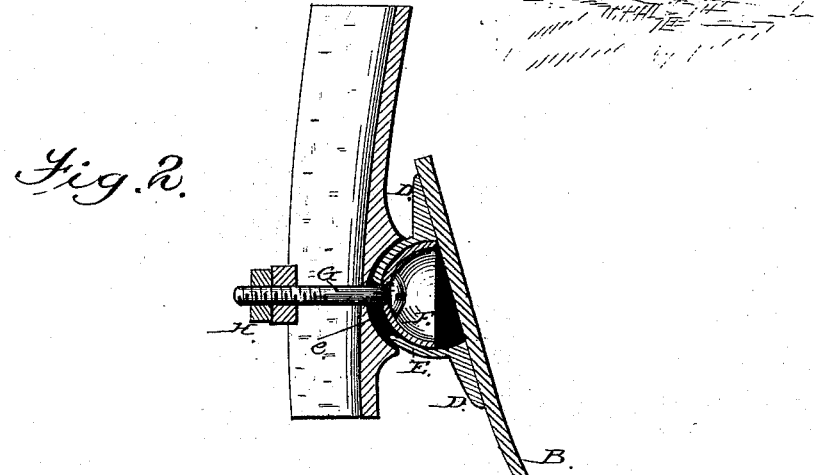

Figure 1 is a perspective view of a cultivator-tooth with my improved coupling attached. Fig. 2 is a vertical section of same.

The object of my invention is to secure an easy and perfect adjustability of the cultivator shovel or tooth upon its standard, whereby it may be turned in any desired direction and set to accommodate any circumstances; and it consists in the combination of three pieces of sheet metal pressed or cast into hollow hemispheres of different diameters, secured and arranged as hereinafter described and claimed.

To enable others skilled in the art to make and use my invention, I will proceed to describe the exact manner in which I have carried it out.

In the drawings, A represents the standard, or this may be a sleeve attached to a standard, and B the plow shovel or tooth, to be attached or coupled to the standard or sleeve A.

On the front of the sleeve, and near its lower end, I secure the hemispherical or cup-shaped cavity C. This cavity may be formed in a separate piece and be secured to the sleeve or standard by any suitable means; or it may be cast or formed in one piece with the sleeve or standard.

On the back of the plow shovel or tooth I secure, by screw-bolts or other suitable means, the plate D, provided with the rounded bowl-shaped projection E, fitting snugly within the cup-shaped cavity C on the standard or sleeve A, so as to turn freely within the cavity when desired.

In the center of the bowl-shaped projection E is formed an enlarged circular opening, *e*, for a purpose hereinafter explained. Within the hollow bowl-shaped projection E is fitted another hemispherical cup-shaped plate or washer, F, bearing smoothly and evenly within the projection on all sides, and through the center of this washer is formed an opening just large enough to receive the screw-bolt G, which secures the plow-shovel to the standard, the head of the bolt being of sufficient size to secure a good bearing on the washer. When the parts are all in position the bolt is secured by the nut H, as shown in Fig. 2.

The operation of my invention is as follows: By loosening the nut H the shovel or tooth B is allowed to turn in any desired direction on the ball-and-socket joint by means of the cup-shaped projection E moving freely between the surfaces of the cup-shaped cavity C and the hemispherical washer F, the circular opening *e* in the projection allowing a sufficient margin for its free movement around the screw-bolt G, the movement being limited only by the size of the opening *e*.

It is evident from this description that by my construction I secure a large bearing-surface within the projection E, giving great strength to the coupling. It is also evident that my improved coupling is equally adapted for plows of all descriptions, and for other uses where it is required to use a ball-and-socket joint of great power.

I am aware that the ball-and-socket joint is not new in couplings for cultivator-teeth, nor do I claim such a joint, broadly. Neither is it new to secure a ball within the socket by means of a bolt having a head to fit on the inner concave surface of the ball.

Having described my invention, what I claim as new, and desire to secure by Letters Patent, is—

The improved coupling for plows, consisting of the cup-shaped cavity C and the hollow projection E, in combination with the hemispherical washer F and bolt G, all constructed and arranged substantially as herein shown and described.

DANIEL C. OWEN.

Witnesses:
JNO. L. CONDRON,
W. F. MORSELL.